United States Patent [19]
White

[11] 3,875,487
[45] Apr. 1, 1975

[54] METHOD AND APPARATUS FOR MOTOR-STARTING CONTROL

[75] Inventor: Laniel B. White, Corpus Christi, Tex.

[73] Assignee: Mobil Oil Corporation, New York, N.Y.

[22] Filed: May 1, 1973

[21] Appl. No.: 356,262

[52] U.S. Cl. ............... 318/485, 318/487, 317/13 A, 317/22, 318/447
[51] Int. Cl. ......................................... H02h 7/085
[58] Field of Search ........... 318/473, 487, 484, 485, 318/447; 317/13 A, 22

[56] References Cited
UNITED STATES PATENTS
| | | | |
|---|---|---|---|
| 3,250,465 | 5/1966 | Look | 318/487 X |
| 3,387,182 | 6/1968 | Fourr | 318/473 UX |
| 3,389,390 | 6/1968 | Waller, Jr. | 340/409 |
| 3,483,431 | 12/1969 | Gilbert | 317/22 |
| 3,586,911 | 6/1971 | Kraus | 317/22 X |
| 3,716,756 | 2/1973 | Runge et al | 317/13 A |
| 3,742,303 | 6/1973 | Dageford | 317/13 A |

*Primary Examiner*—B. Dobeck
*Attorney, Agent, or Firm*—C. A. Huggett; George W. Hager, Jr.

[57] ABSTRACT

A motor is electrically coupled to a power source through a motor starter. The motor starter is selectively operated by a relay to connect and disconnect the power source to the motor. A counter provides an indication of the number of times the motor fails to run after being connected to the power source. The relay is operated to cause the motor starter to disconnect the power source from the motor in response to the number of times the motor fails to start and run continuously for a given time after the power source has been connected to the motor.

3 Claims, 5 Drawing Figures

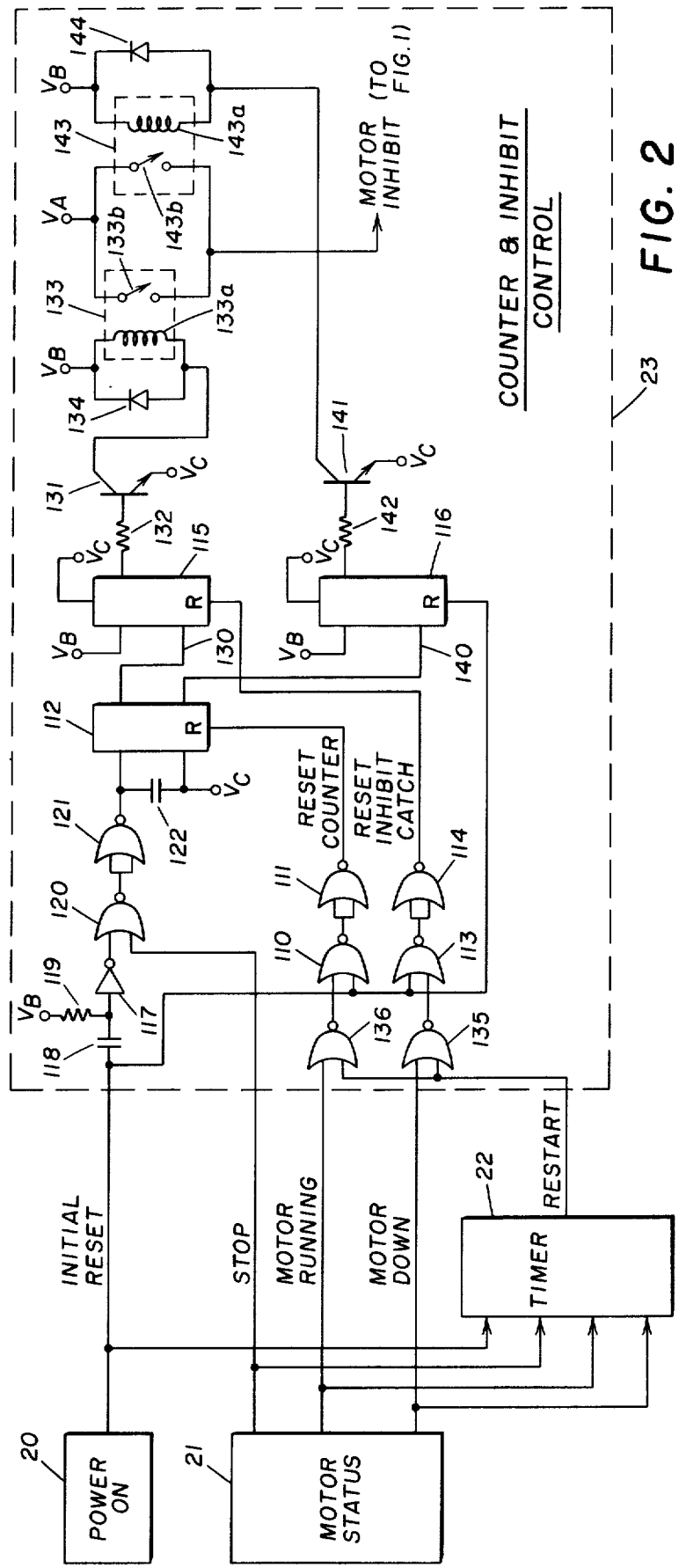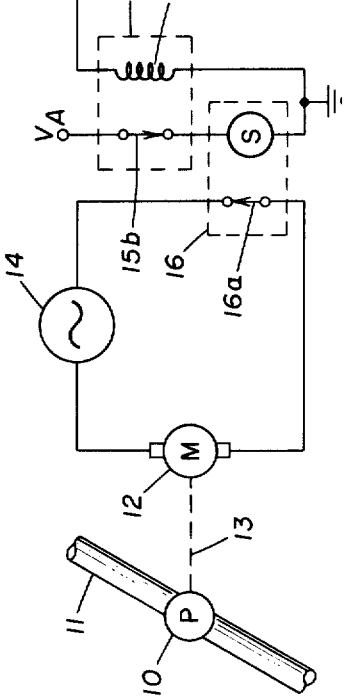

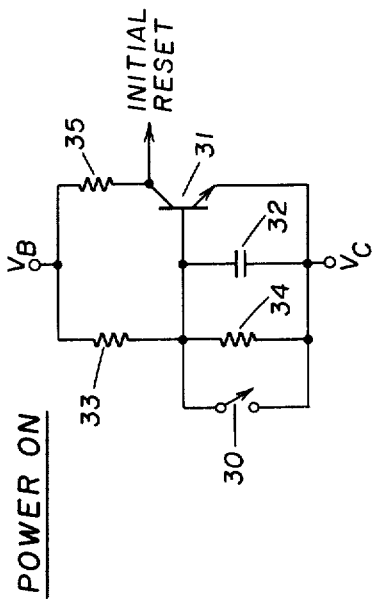
FIG. 3 POWER ON
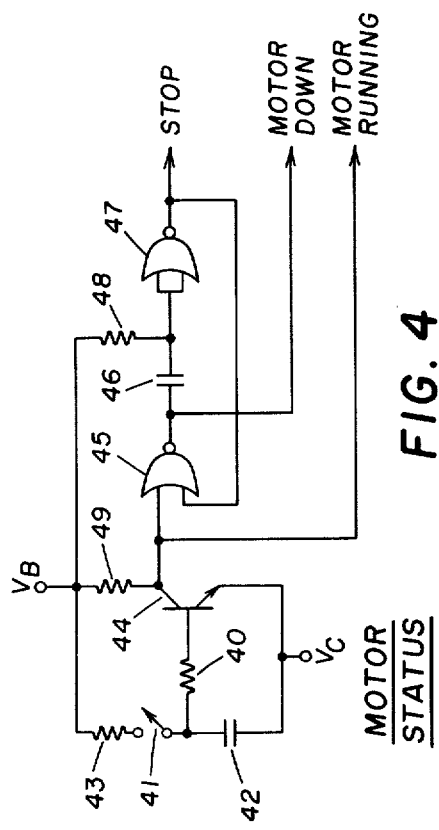
FIG. 4 MOTOR STATUS
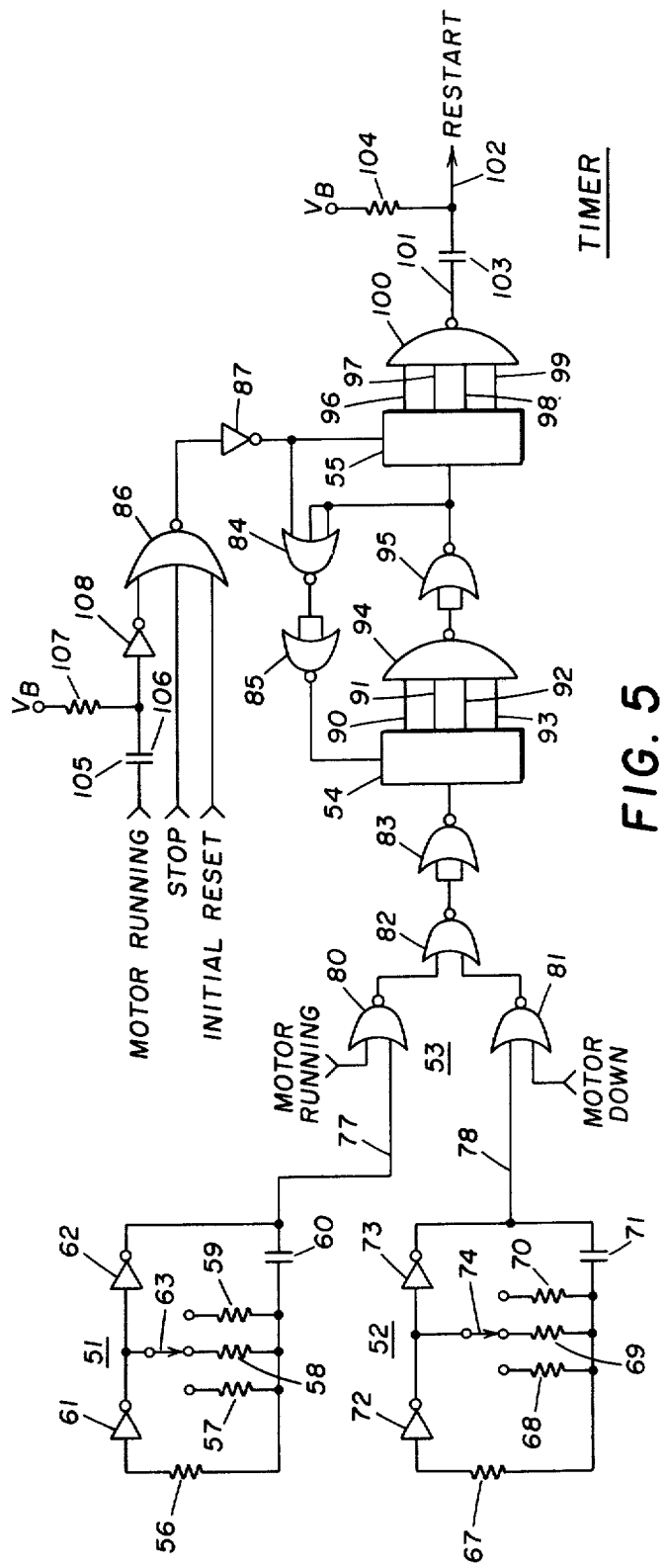
FIG. 5 TIMER 3,875,487

METHOD AND APPARATUS FOR MOTOR-STARTING CONTROL

BACKGROUND OF THE INVENTION

Induction motors are conventionally used in controlling the operation of a pipeline pumping station. Due to the nature of pipeline operations, these motors are intermittently operated to turn the pumps ON and OFF. The starting current required for operating large induction motors is sufficient to cause a heat build-up in the windings. Too great a heat build-up can damage the windings. It is therefore important that the motor be run long enough to dissipate this start-up heat or, in the alternative, turned OFF long enough to dissipate the heat prior to a subsequent starting of the motor.

Various system malfunctions can cause the pumping operation to be started too frequently for safe operation of these large induction starting motors. Two such examples are resistor failures in the unit starter resulting in a pulsing of the starter and pressure fluctuations at pressure controlled stations. Various electromechanical devices have been utilized to prevent these malfunctions from resulting in heat build-up damage to the starting motor. Such devices have included stepping switches and timers for counting the number of motor startings and ensuring a minimum cooling time between each starting.

SUMMARY OF THE INVENTION

The present invention is directed to a method and apparatus for controlling the connection of a power source to a motor to prevent damaging heat build-up in the motor windings due to the starting currents. In one aspect, a power source supplies starting current for the motor through a motor starter. The motor starter is operated by a relay in response to the number of times the motor fails to start and run continuously for a given time period after the connection of the starting current to the motor.

In a further aspect, a pulse is generated each time the motor fails to run after being connected to the power source. A counter accumulates a total count of these pulses. Any time the motor runs continuously for the duration of a given time period, the counter is reset. However, should the total count of the counter reach a first predetermined number prior to being reset, the relay operates the motor starter to disconnect the power source from the motor for a predetermined time delay. At the end of the predetermined time delay, the relay operates the motor starter to reconnect the power source to the motor. The counter then continues to accumulate counts until a second predetermined number of counts is reached. At this time, the relay again operates the motor starter to disconnect the power source from the motor. At this point, the power source remains disconnected from the motor until a manual resetting of the relay is effected.

BRIEF DESCRIPTION OF THE DRAWINGS

FIG. 1 illustrates a typical motor-driven pumping operation.

FIG. 2 is a block diagram, partially in electrical schematic form, of the motor restart limiter of the present invention.

FIGS. 3–5 are electrical schematic diagrams of portions of the motor restart limiter illustrated in block form in FIG. 2.

DETAILED DESCRIPTION OF THE PREFERRED EMBODIMENT

Referring now to FIG. 1, there is illustrated a pump 10 for delivering fluid products along a pipeline 11. The pump 10 is driven by the motor 12 shown mechanically coupled to the pump by way of dashed line 13. The motor 12 may be a conventional single-phase induction motor. A motor power supply 14 is coupled to the motor 12 by way of contacts 16a of a starter 16 and provides the single-phase AC power required for driving the motor 12. A motor control relay 15 includes normally closed contacts in series with the starter 16 and the voltage source $V_A$. The operation of motor control relay 15 is controlled by a motor inhibit signal from the motor restart limiter of FIG. 2.

The motor restart limiter is designed to limit the number of times and the frequency that the motor 12 may be started. Under normal operating conditions the motor control relay 15 is de-energized and its normally closed contacts 15b permit the voltage source $V_A$ to energize the starter 16. When starter 16 is energized, the contacts 16a are closed to electrically connect the power source 14 to the motor 12. However, when there is system malfunction such that the motor 12 fails to start after, for example, two successive attempts, the motor restart limiter produces the motor inhibit signal which de-energizes the motor control relay 15, opening its normally closed contacts 15b to cause starter 16 to be de-energized, thereby breaking the electrical connection of the power source 14 to the motor 12. After a predetermined time delay (sufficient to permit heat build-up in the motor windings from the high starting currents to cool), the motor inhibit signal is removed from motor control relay 15. Relay 15 is therefore de-energized and AC power again applied to motor 12 for a third attempt at starting. If, however, motor 12 is not successfully started on the third attempt, or if successfully started does not continue to run without malfunction for the predetermined time delay, the motor inhibit signal is again produced to prevent any further motor startings until the motor restart limiter is manually reset to remove the motor inhibit signal from motor control relay 15.

The operation of the motor restart limiter in producing the motor inhibit signal will be more fully described with reference to FIGS. 2–5.

Referring now to FIG. 2, the motor control limiter includes a power-on unit 20, a motor status unit 21, a timer 22, and a counter and inhibit control unit 23. The power-on unit 20 provides an initial reset pulse when the power is first applied to the motor restart limiter. The motor status unit 21 operates in response to the condition of the motor 12. When the motor is running, a motor-running pulse is provided. The motor-running pulse lasts for the duration of the motor running time. When the motor is shut down, both a stop pulse and a motor-down pulse are provided. The motor-down pulse lasts for the duration of the motor-down time. The four pulses, initial reset, motor-running, stop, and motor-down, are applied to the timer 22. Timer 22 functions in response to these four pulses to provide a restart pulse after a predetermined time delay as set within the timer unit itself.

The foregoing-described pulses provided by the power-on unit 20, the motor status unit 21, and the timer 22 are applied to the counter and inhibit control unit 23 which responds to these pulses to provide the motor inhibit pulse for the de-energization of the motor control relay 15 and the shutdown of the motor 12.

Each of the units 20–22 will now be described in detail with reference to FIGS. 3–5 prior to the description of the counter and inhibit control unit 23 of FIG. 2. In this manner, the operation of unit 23 under the control of the units 20–22 will be more fully understood.

POWER-ON (FIG. 3)

Prior to the initial attempt at starting up the motor 12, the switch 30 in the power-on unit is closed to turn transistor 31 OFF, thereby providing for a logic 1 initial reset pulse. As the voltage across capacitor 32 increases, the base voltage to transistor 31 increases until transistor 31 turns ON. At this time, the collector of transistor 31 is pulled down toward the supply voltage $V_C$ and the initial reset pulse is terminated, that is, it becomes a logic 0. The resistors 33–35 and the voltage supplies $V_B$ and $V_C$ provide the necessary bias conditions for the transistor 31.

MOTOR STATUS (FIG. 4)

The switch 41 is opened and closed in response to the operation of motor 12. When motor 12 is running, switch 41 is closed. When motor 12 is shut down, switch 41 is opened. More specifically, when switch 41 is closed, capacitor 42 charges through resistor 43 and causes transistor 44 to conduct and provide a logic 0 motor-running pulse. When the motor 12 is shut down, switch 41 opens and causes transistor 44 to turn OFF, its collector thereby going to a logic 1 level and terminating the motor-running pulse. Gate 45 is coupled to the collector of transistor 44 and responds to this logic 1 level on the collector to provide for a logic 0 motor-down pulse. This motor-down pulse is connected to capacitor 46 which provides a logic 0 to both inputs of gate 47. The output of gate 47 is a logic 1 stop pulse for the duration of the charging time of capacitor 46 through the resistor 48. Resistors 40 and 49 and voltage supplies $V_B$ and $V_C$ provide the necessary bias conditions for transistor 44.

TIMER (FIG. 5)

The timer unit 22 includes two free-running oscillators 51 and 52, an oscillator selector 53, and two ripple-through binary counters 54 and 55. The oscillator 51 includes resistors 56–59, capacitor 60, inverters 61 and 62, and frequency selector switch 63. The setting of switch 63 on one of resistors 57–59 determines the time constant for charging of capacitor 60 which in turn determines the frequency of operation of oscillator 51.

The oscillator 52 includes resistors 67–70, capacitor 71, inverters 72 and 73, and frequency selector switch 74. As in the case of oscillator 51, the setting of switch 74 on one of resistors 68–70 determines the frequency of operation of oscillator 52.

The outputs of oscillators 51 and 52 are applied by way of lines 77 and 78, respectively, to the oscillator selector 53. Oscillator selector 53 includes gates 80–83. When the motor is not running, the motor-down signal to gate 81 is at logic 0 and the motor-running signal to gate 80 is at logic 1. Under this condition, the output of oscillator 52 on line 78 is gated through gates 81–83 to the first ripple counter 54, while the output of oscillator 51 on line 77 is inhibited by gate 80. Similarly, when the motor is running, the logic 0 motor-running signal permits the output of oscillator 51 on line 77 to be gated through gates 80, 82, and 83 to the first ripple counter 54, while the logic 1 motor-down signal inhibits the output of oscillator 52 from being gated to the counter 54.

The first ripple-through counter 54 counts the pulses of the signal applied to it from the oscillator selector 53 and provides for count outputs of 1,024, 2,048, 4,096, and 8,192 counts, respectively, on lines 90–93. For example, upon a count of 1,024 input pulses, the output of counter 54 on line 90 goes to a logic 1. Upon the additional count of 2,048 pulses, the output on line 91 goes to logic 1. Similarly, upon the counts of an additional 4,096 and an additional 8,192 pulses, lines 92 and 93, respectively, 90 to a logic 1. When all four lines 90–93 are at logic 1, gate 94 provides a logic 0 output to indicate that a total pulse count of 15,360 has been reached. The output of gate 94 is inverted by gate 95 to a logic 1 count pulse which is then applied to the second ripple-through counter 55 and to the gate 84. The second ripple-through counter 55 advances one count in response to the count pulse. The count pulse also is gated through gates 84 and 85 to reset the first ripple-through counter 54. Upon counter 54 again reaching a count of 15,360, the second counter 55 is advanced an additional count, and counter 54 is again reset.

At the count of eight by the second ripple-through counter 55, the output line 96 goes to a logic 1. Upon an additional count of 16, the output line 97 goes to logic 1. Similarly, upon an additional count of 32 and thereafter an additional count of 64, output lines 98 and 99, respectively, go to logic 1. When all four output lines 96–99 are at logic 1, gate 100 provides a logic 0 output on line 101, indicating that a total pulse count of 120 has been reached by the second ripple-through counter 55. This logic 0 pulse output of gate 101 causes a logic 0 to appear as a time delayed restart pulse on line 102 for the charging time of capacitor 103 through resistor 104 to the voltage supply $V_B$.

Initially, both ripple-through counters 54 and 55 are reset to zero count by the initial reset pulse occurring when power to the motor restart limiter is turned ON. This initial reset pulse is applied through gate 86 and inverter 87 to the reset input of counter 55 and further through the gates 84 and 85 to the reset input of counter 54.

In addition, the counters 54 and 55 must be reset for each new selection of the oscillators 51 and 52. For example, each time the motor is shut down, the motor-down pulse gates the output of oscillator 52 to the first ripple-through counter 54. Coincidentally, the stop pulse is applied through gate 86 and inverter 87 to the reset input of counter 55 and further through gates 84 and 85 to the reset input of counter 54. Likewise, each time the motor starts up, the motor-running pulse gates the output of oscillator 51 to the first ripple-through counter 54. Coincidentally, the motor-running pulse is applied to capacitor 105. Capacitor 105 pulls line 106 to a logic 0 pulse for the charging time of capacitor 105 through resistor 107 to voltage supply $V_B$. This logic 0 pulse is applied through inverter 108, gate 86, and inverter 87 to the reset input of counter 55 and further through gates 84 and 85 to the reset input of counter 54.

Having now described in detail the operation of the power-on unit 20, the motor status 21, and the timer 22 in conjunction with FIGS. 3–5, reference may again be made to FIG. 2 for a detailed description of the operation of the counter and inhibit control unit 23.

COUNTER AND INHIBIT CONTROL (FIG. 2)

Initially, when power is applied to the motor restart limiter, the power-on unit 20 provides an initial reset pulse to the counter and inhibit control unit 23. The initial reset pulse is applied through gates 110 and 111 to reset the fail-to-start counter 112 and through gates 113 and 114 to reset the inhibit latch 115. This initial reset pulse is also directly applied to reset the inhibit latch 116. The initial reset pulse also provides for a logic 1 initialize pulse from inverter 117 for the charging time of capacitor 118 through resistor 119. This initialize pulse is applied through gates 120 and 121 to initially advance the fail-to-start counter 112 to "count 1." Additional noise immunity is provided by capacitor 122 and supply voltage $V_C$.

The motor 12 is then activated to start the pumping operation. Should the motor 12 fail to start, the stop pulse from motor status unit 21 advances the fail-to-start counter to "count 2." A second attempt is made to start the motor 12; but, if it again fails to start, the fail-to-start counter is advanced by another stop pulse to "count 3."

At "count 3," fail-to-start counter 112 provides a logic 1 output on line 130 to the inhibit latch 115 which is a dual-D flip-flop. Upon application of a logic 1 to its input at "count 3," the output of inhibit latch 115 is set to a logic 1 until such time as it is reset. This logic 1 output turns ON transistor 131 through base resistor 132. The collector current of transistor 131 energizes coil 133a of a first motor inhibit relay 133. Transistor 131 is protected from reverse currents by diode 134. Upon energization, relay contacts 133b are closed, thereby applying the supply voltage $V_1$ as a motor inhibit signal directly to the motor control relay 15 (FIG. 1). The motor inhibit signal energizes relay coil 15a and, consequently, the normally closed contacts 15b are opened, thereby causing shutdown of the motor 12 after the second unsuccessful starting attempt.

After a second unsuccessful motor starting attempt, the motor restart limiter prevents a third attempt at motor starting for a predetermined time delay. The inhibit latch 115 remains in a logic 1 state so as to maintain energization of relays 133 and 15 during the predetermined time delay to permit the heat build-up in the motor windings from the high starting currents of the two unsuccessful starting attempts to be dissipated before the next starting attempt. This time delay is controlled by the timer section (FIG. 5) which provides a restart pulse at the end of the predetermined time delay. This restart pulse is applied through gates 135, 113, and 114 to reset the inhibit latch 115 and, consequently, de-energize relays 133 and 15. With relay 15 deenergized, relay contacts 15b are closed and a third attempt may be made at starting the motor 12. Should the motor again fail to start, the stop pulse advances the fail-to-start counter 112 to "count 4." At this time, counter 112 provides a logic 1 output on line 140 to the inhibit latch 116 which is also a dual-D flip-flop.

Upon application of a logic 1 to its input at "count 4," the output of inhibit latch 116 is set to a logic 1 until it is reset. This logic 1 output turns ON transistor 141 through base resistor 142. The collector current of transistor 141 energizes coil 143a of a second motor inhibit relay 143. Transistor 141 is protected from reverse currents by diode 144. Upon energization, relay contacts 143b are closed, thereby applying the supply voltage $V_1$ as a motor inhibit signal directly to the motor control relay 15 (FIG. 1). The motor inhibit signal again causes shutdown of the motor 12 after the third unsuccessful starting attempt. The motor 12 is prevented from further restart attempts until reset switch 30 in the power-on unit 20 (FIG. 3) is manually closed to produce an initial reset pulse for resetting the inhibit latch 116, thereby removing the motor inhibit signal from motor control relay 15.

The counter and inhibit control unit 23 has now been described under the circumstance wherein the motor has failed to successfully start on three successive attempts. After the second unsuccessful attempt, the motor is prevented from a third attempt for a predetermined time delay to ensure cooling of the windings before the third starting attempt. After the third unsuccessful attempt, the motor is shut down until it is manually reset.

When, however, the motor, at any time, is successfully started and continues to run without failure in excess of the predetermined time delay, the following sequence of operations occurs. The motor-running pulse from the motor status unit 21 permits the output of frequency oscillator 51 of the timer unit 22 (FIG. 5) to be gated through the oscillator section 53 to the first ripplethrough counter 54 each time the motor-running pulse is provided. The second ripple-through counter, after a count of 120, produces the time delayed restart pulse. If the motor is still running at this time, the motor-running pulse gates the restart pulse through gates 136, 110, and 111 of the counter and inhibit control unit 23 (FIG. 2) to reset the fail-to-start counter 112. The fail-to-start counter remains reset to zero until the motor fails or is shut down, at which time it is set to the count of 1 by the next initial reset pulse from the power-on unit 20.

The foregoing-detailed description of one embodiment of the invention has described the setting of the frequency oscillators 51 and 52 as controlling the time-delay period between the production of a motor-running or a motor-down pulse and the restart pulse. Suitable time delays between the motor-running pulse and the restart pulse have been found to be in the order of 5 to 15 minutes. Accordingly, the three settings of frequency selector switch 63 of oscillator 51 may produce frequencies in the order of 6.145, 3.072, and 2.048 KHz for time delays of 5, 10, and 15 minutes, respectively.

Suitable time delays between the motor-down pulse and the restart pulse have been found to be in the order of 15 to 60 minutes. Accordingly, the three settings of frequency selector switch 74 of oscillator 52 may produce frequencies in the order of 2.048, 1.024, and 0.512 KHz for time delays of 15, 30, and 60 minutes, respectively.

In accordance with the specific embodiment described herein and illustrated in the accompanying drawings, the following table sets forth specific types and values of circuit components which may be utilized. Specifically, resistors 57, 58, and 59 may be utilized for oscillator 51 outputs of 6.145, 3.072, and 2.048 KHz, respectively. Resistors 68, 69, and 70 may be utilized for oscillator 52 outputs of 2.048, 1.024, and 0.512 KHz, respectively. It may be appreciated, however, that by proper selection of the values of these oscillator resistors, other desirable oscillator frequencies may be produced for varying the length of the time-delay period.

TABLE

| Item | Description |
| --- | --- |
| Relay 15 | Westinghouse AR4A 120VAC |
| Relays 133 and 143 | Potter and Brumfield KHP17D11 12VDC |
| Diodes 134 and 144 | Motorola 1N4005 |
| Transistor 31 | Motorola MPS6515 |
| Transistors 44, 131, and 141 | Motorola MPS3705 |
| Counter 112 | RCA CD4017E/AE |
| Counter 54 | RCA CD4020E/AE |
| Counter 55 | RCA CD4004E/AE |
| Latches 115 and 116 | RCA CD4013E/AE |
| NAND gates 94 and 100 | RCA CD4012E/AE |
| NOR gate 86 | RCA CD4000E/AE |
| Inverter 87 | RCA CD4000E/AE |
| All other NOR gates | RCA CD4001E/AE |
| All other inverters | RCA CD4009E/AE |
| Resistor 40 | 120 ohms |
| Resistor 57 | 221 Kohms |
| Resistor 58 | 140 Kohms |
| Resistor 59 | 64.9 Kohms |
| Resistor 68 | 162 Kohms |
| Resistor 69 | 80.6 Kohms |
| Resistor 70 | 34.8 Kohms |
| Resistors 33–35, 43, 49, 104, 107, 132, and 142 | 10 Kohms |
| Resistors 48 and 119 | 39 Kohms |
| Resistors 56 and 67 | 510 Kohms |
| Capacitor 42 | 10 microfarads |
| Capacitor 60 | 1,000 picofarads |
| Capacitor 71 | 6,200 picofarads |
| Capacitors 32 and 105 | 1 microfarad |
| Capacitors 46 and 118 | 0.47 microfarad |
| Capacitors 103 and 122 | 0.1 microfarad |
| Voltage supply $V_1$ | 120 VAC |
| Voltage supply $V_B$ | +12 VDC |
| Voltage supply $V_c$ | −12 VDC |

I claim:

1. A method of controlling the operation of a motor, comprising the steps of:
   a. producing a pulse each time the motor shuts down,
   b. counting said pulses having sequentially occurred without the motor having continuously run for a given time period between pulses,
   c. shutting down the motor a first time when the number of said pulses counted equals a first number,
   d. automatically restarting the motor at the end of a given time delay, said time delay having begun when the motor was shut down,
   e. continuing the sequential counting of said pulses, and
   f. shutting down the motor a second time when the number of said pulses counted equals a second number.

2. A system for controlling the operation of a motor from a power source, comprising:
   a. first means selectively operable for connecting and disconnecting the power source to the motor,
   b. second means responsive to the operation of the motor for providing a pulse each time the motor fails,
   c. a counter to which said pulses are applied for providing a count output of the number of times the motor has failed,
   d. third means for resetting said counter each time the motor runs continuously for the duration of a given time period,
   e. fourth means responsive to the count output of said counter for causing said first means to disconnect the power source from the motor for a given time delay after a first predetermined number of counts, said first means again connecting the power source to the motor at the end of the time delay, and
   f. fifth means responsive to the count output of said counter for causing said first means to again disconnect the power source to the motor after a second predetermined number of counts.

3. A system for controlling the starting of a motor, comprising:
   a. a motor,
   b. a power source,
   c. first means for connecting and disconnecting the power source to the motor,
   d. second means responsive to the condition of said motor for producing a stop pulse each time the motor shuts down,
   e. a counter to which said stop pulses are applied, said counter providing at least two count pulses, a first count pulse when the total count of said counter equals a first number and a second count pulse when the total count of said counter equals a second number,
   f. third means responsive to the condition of said motor for resetting said counter each time the motor runs continuously for a predetermined time period,
   g. fourth means enabled by said first count pulse for causing said first means to disconnect the power source to the motor,
   h. fifth means for disabling said fourth means a predetermined time delay after said first count pulse, thereby causing said first means to again connect the power source to the motor, and
   i. sixth means responsive to said second count pulse for causing said first means to again disconnect the power source to the motor.

* * * * *

UNITED STATES PATENT OFFICE
CERTIFICATE OF CORRECTION

PATENT NO. : 3,875,487
DATED : April 1, 1975
INVENTOR(S) : Laniel B. White

It is certified that error appears in the above-identified patent and that said Letters Patent are hereby corrected as shown below:

Column 4, line 19,
"90" should be --go--.

Column 6, lines 33 and 34,
"rip-plethrough" should be -- ripple-through --.

Signed and sealed this 17th day of June 1975.

(SEAL)
Attest:

RUTH C. MASON
Attesting Officer

C. MARSHALL DANN
Commissioner of Patents
and Trademarks